US009653056B2

(12) United States Patent
Eronen

(10) Patent No.: US 9,653,056 B2
(45) Date of Patent: May 16, 2017

(54) EVALUATION OF BEATS, CHORDS AND DOWNBEATS FROM A MUSICAL AUDIO SIGNAL

(75) Inventor: Antti Johannes Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 107 days.

(21) Appl. No.: 14/397,826

(22) PCT Filed: Apr. 30, 2012

(86) PCT No.: PCT/IB2012/052157
§ 371 (c)(1),
(2), (4) Date: Mar. 22, 2015

(87) PCT Pub. No.: WO2013/164661
PCT Pub. Date: Nov. 7, 2013

(65) Prior Publication Data
US 2016/0027420 A1 Jan. 28, 2016

(51) Int. Cl.
*G06F 17/00* (2006.01)
*G10H 1/40* (2006.01)
*G10H 1/38* (2006.01)

(52) U.S. Cl.
CPC ............... *G10H 1/40* (2013.01); *G10H 1/383* (2013.01); *G10H 2210/051* (2013.01);
(Continued)

(58) Field of Classification Search
CPC ................................ G10H 1/40; G10H 1/383
(Continued)

(56) References Cited

U.S. PATENT DOCUMENTS 6,316,712 B1 11/2001 Laroche
6,542,869 B1 4/2003 Foote
(Continued)

FOREIGN PATENT DOCUMENTS

CN 101751912 A 6/2010
JP 2004-096617 A 3/2004
(Continued)

OTHER PUBLICATIONS

Seppanen et al., "Joint Beat & Tatum Tracking From Music Signals", Proceedings of the 7th International Conference on Music Information Retrieval, Oct. 8-12, 2006, 6 pages.
(Continued)

*Primary Examiner* — Paul McCord
(74) *Attorney, Agent, or Firm* — Alston & Bird LLP

(57) ABSTRACT

A server system 500 is provided for receiving video clips having an associated audio/musical track for processing at the server system. The system comprises a beat tracking module for identifying beat time instants ($t_i$) in the audio signal and a chord change estimation module for determining a chord change likelihood from chroma accent information in the audio signal at the beat time instants ($t_i$). Further, first and second accent-based estimation modules are provided for determining respective first and second accent-based downbeat likelihood values from the audio signal at the beat time instants ($t_i$) using respective different algorithms. A final stage of processing identifies downbeats occurring at beat time instants ($t_i$) using a predefined score-based algorithm that takes as input numerical representations of chord change likelihood and the first and second accent-based downbeat likelihood values at the beat time instants ($t_i$).

16 Claims, 6 Drawing Sheets

(52) U.S. Cl.
CPC . *G10H 2210/066* (2013.01); *G10H 2210/076* (2013.01); *G10H 2230/015* (2013.01)

(58) Field of Classification Search
USPC .......................................................... 700/94
See application file for complete search history.

(56) References Cited

U.S. PATENT DOCUMENTS

| | | | |
|---|---|---|---|
| 7,612,275 | B2 | 11/2009 | Seppanen et al. |
| 8,440,901 | B2 | 5/2013 | Nakadai et al. |
| 2003/0205124 | A1 | 11/2003 | Foote et al. |
| 2004/0200335 | A1 | 10/2004 | Phillips |
| 2007/0261537 | A1 | 11/2007 | Eronen et al. |
| 2007/0291958 | A1 | 12/2007 | Jehan |
| 2008/0236371 | A1 | 10/2008 | Eronen |
| 2010/0170382 | A1 | 7/2010 | Kobayashi |
| 2010/0188580 | A1 | 7/2010 | Paschalakis et al. |
| 2011/0255700 | A1 | 10/2011 | Maxwell et al. |
| 2014/0060287 | A1 | 3/2014 | Okuda |
| 2015/0094835 | A1 | 4/2015 | Eronen et al. |

FOREIGN PATENT DOCUMENTS

| | | | |
|---|---|---|---|
| JP | 2004-302053 | A | 10/2004 |
| JP | 2006-518492 | A | 8/2006 |
| JP | 2007-052394 | A | 3/2007 |
| JP | 2008-076760 | A | 4/2008 |
| JP | 2008-233812 | A | 10/2008 |
| WO | 2004/042584 | A2 | 5/2004 |
| WO | 2013/164661 | A1 | 11/2013 |

OTHER PUBLICATIONS

Klapuri et al., "Analysis of the Meter of Acoustic Musical Signals", IEEE Transactions on Audio, Speech, and Language Processing, vol. 14, No. 1, Jan. 2006, 15 Pages.

Jehan, "Creating Music by Listening", Thesis, Sep. 2005, pp. 1-137.

Ellis, "Beat Tracking by Dynamic Programming", Journal of New Music Research, vol. 36, No. 1, Mar. 2007, pp. 1-21.

Cemgil et al., "On Tempo Tracking: Tempogram Representation and Kalman filtering", Journal of New Music Research, vol. 29, No. 4, 2001, 19 pages.

International Search Report and Written Opinion received for corresponding Patent Cooperation Treaty Application No. PCT/IB2012/053329, dated Apr. 15, 2013, 12 pages.

McKinney et al., "Evaluation of Audio Beat Tracking and Music Tempo Extraction Algorithms", Journal of New Music Research, vol. 36, No. 1, , 2007, pp. 1-16.

Davies et al., "Context-Dependent Beat Tracking of Musical Audio", IEEE Transactions on Audio, Speech, and Language Processing, vol. 15, No. 3, Mar. 2007, pp. 1009-1020.

Gkiokas et al., "Music Tempo Estimation and Beat Tracking by Applying Source Separation and Metrical Relations", IEEE International Conference on Acoustics, Speech and Signal Processing, Mar. 25-30, 2012, pp. 421-424.

Ellis, "Beat Tracking With Dynamic Programming", Music Information Retrieval Evaluation exchange 2006, 3 pages.

Klapuri, "Multiple Fundamental Frequency Estimation by Summing Harmonic Amplitudes", Proceedings of the 7th International Conference on Music Information Retrieval, Oct. 8-12, 2006, 6 pages.

Extended European Search Report received for corresponding European Patent Application No. 12880120.6, dated Nov. 4, 2015, 12 pages.

Deinert et al., "Regression-Based Tempo Recognition From Chroma and Energy Accents for Slow Audio Recordings", Proceedings of the AES 42nd International Conference on Semantic Audio, Jul. 2011, 9 pages.

Extended European Search Report received for corresponding European Patent Application No. 12875874.5, dated Nov. 9, 2015, 08 pages.

Scaringella et al., "A Real-Time Beat Tracker for Unrestricted Audio Signals", In proceedings of the conference of sound and music computing, Oct. 20-22, 2004, 6 pages.

Papadopoulos et al., "Simultaneous Estimation of Chord Progression and Downbeats From an Audio File", IEEE International Conference on Acoustics, Speech and Signal Processing, Mar. 31-Apr. 4, 2008, pp. 121-124.

International Search Report and Written Opinion received for corresponding Patent Cooperation Treaty Application No. PCT/IB2012/052157 , dated Feb. 18, 2013, 12 pages.

Peeters, G. at al.:"Simultaneous beat and downbeat-tracking using a 1-49 probabilistic framework: theory and large-scale evaluation", IEEE Trans. on Audio, Speech, and Language Processing, vol. 19, No. 6, Aug. 2011, pp. 1754-1769.

Goto, M.: "An audio-based real-time beat tracking system for music with or without drum-sounds", Journal of New Music Research, vol. 30, No. 2, 2001. pp. 159-171.

Eronen, A. J. et al: "Music tempo estimation with k-NN regression", IEEE Trans. on Audio, Speech, and Language Processing, vol. 18, No. 1, Jan. 2010, pp. 50-57.

Papadopoulos, H. et al.: "Joint estimation of chords and downbeats from an audio signal", IEEE Trans. on Audio, Speech, and Language Processing, vol. 19, No. 1, Jan. 2011, pp. 138-152.

Zenz, V. et al.: "Automatic chord detection incorporating beat and key detection", In proc. Int. Conf. on Signal Processing and Communications (ICSPC 2007), Nov. 24-27, 2007, Dubai, United Arab Emirates, pp. 1175-1178.

Degara, N. et al.: "Reliability-informed beat tracking of musical signals", IEEE Trans. on Audio, Speech, and Language Processing, vol. 20, No. 1, Jan. 2012, pp. 290-301.

Notice of Allowance for U.S. Appl. No. 14/409,647 mailed Aug. 9, 2016.

Non-Final Office action received for corresponding U.S. Appl. No. 14/409,647, dated Jan. 15, 2016, 09 pages.

Office action received for corresponding Japanese Patent Application No. 2015-519368, dated Feb. 4, 2016, 05 pages of office action and no pages of Translation available.

Office action received for corresponding Chinese Patent Application No. 201280074293.7, dated Jul. 28, 2016, 12 pages of office action and no pages of Translation available.

Office Action for Chinese Patent Application No. 201280074293.7 dated Jan. 25, 2017.

EVALUATION OF BEATS, CHORDS AND DOWNBEATS FROM A MUSICAL AUDIO SIGNAL

RELATED APPLICATION

This application was originally filed as PCT Application No. PCT/IB2012/052157 filed Apr. 30, 2012.

FIELD OF THE INVENTION

This invention relates to a method and system for audio signal analysis and particularly to a method and system for identifying downbeats in a music signal.

BACKGROUND OF THE INVENTION

In music terminology, a downbeat is the first beat or impulse of a bar (also known as a measure). It frequently, although not always, carries the strongest accent of the rhythmic cycle. The downbeat is important for musicians as they play along to the music and to dancers when they follow the music with their movement.

There are a number of practical applications in which it is desirable to identify from a musical audio signal the temporal position of downbeats. Such applications include music recommendation applications in which music similar to a reference track is searched for, in Disk Jockey (DJ) applications where, for example, seamless beat-mixed transitions between songs in a playlist is required, and in automatic looping techniques.

A particularly useful application has been identified in the use of downbeats to help synchronise automatic video scene cuts to musically meaningful points. For example, where multiple video (with audio) clips are acquired from different sources relating to the same musical performance, it would be desirable to automatically join clips from the different sources and provide switches between the video clips in an aesthetically pleasing manner, resembling the way professional music videos are created. In this case it is advantageous to synchronize switches between video shots to musical downbeats.

The following terms are useful for understanding certain concepts to be described later.

Pitch: the physiological correlate of the fundamental frequency ($f_0$) of a note.

Chroma, also known as pitch class: musical pitches separated by an integer number of octaves belong to a common pitch class. In Western music, twelve pitch classes are used.

Beat or tactus: the basic unit of time in music, it can be considered the rate at which most people would tap their foot on the floor when listening to a piece of music. The word is also used to denote part of the music belonging to a single beat.

Tempo: the rate of the beat or tactus pulse represented in units of beats per minute (BPM).

Bar or measure: a segment of time defined as a given number of beats of given duration. For example, in a music with a 4/4 time signature, each measure comprises four beats.

Downbeat: the first beat of a bar or measure.

Accent or Accent-based audio analysis: analysis of an audio signal to detect events and/or changes in music, including but not limited to the beginning of all discrete sound events, especially the onset of long pitched sounds, sudden changes in loudness of timbre, and harmonic changes. Further detail is given below.

Human perception of musical meter involves inferring a regular pattern of pulses from moments of musical stress, a.k.a. accents. Accents are caused by various events in the music, including the beginnings of all discrete sound events, especially the onsets of long pitched sounds, sudden changes in loudness or timbre, and harmonic changes. Automatic tempo, beat, or downbeat estimators may try to imitate the human perception of music meter to some extent, by measuring musical accentuation, estimating the periods and phases of the underlying pulses, and choosing the level corresponding to the tempo or some other metrical level of interest. Since accents relate to events in music, accent based audio analysis refers to the detection of events and/or changes in music. Such changes may relate to changes in the loudness, spectrum, and/or pitch content of the signal. As an example, accent based analysis may relate to detecting spectral change from the signal, calculating a novelty or an onset detection function from the signal, detecting discrete onsets from the signal, or detecting changes in pitch and/or harmonic content of the signal, for example, using chroma features. When performing the spectral change detection, various transforms or filterbank decompositions may be used, such as the Fast Fourier Transform or multirate filterbanks, or even fundamental frequency fo or pitch salience estimators. As a simple example, accent detection might be performed by calculating the short-time energy of the signal over a set of frequency bands in short frames over the signal, and then calculating difference, such as the Euclidean distance, between every two adjacent frames. To increase the robustness for various music types, many different accent signal analysis methods have been developed.

The system and method to be described hereafter draws on background knowledge described in the following publications which are incorporated herein by reference.

[1] Peeters and Papadopoulos, "Simultaneous Beat and Downbeat-Tracking Using a Probabilistic Framework: Theory and Large-Scale Evaluation","IEEE Trans. Audio, Speech and Language Processing, Vol. 19, No. 6, August 2011.

[2] Eronen, A. and Klapuri, A., "Music Tempo Estimation with k-NN regression," IEEE Trans. Audio, Speech and Language Processing, Vol. 18, No. 1, January 2010.

[3] Seppänen, Eronen, Hiipakka. "Joint Beat & Tatum Tracking from Music Signals", International Conference on Music Information Retrieval, ISMIR 2006 and Jarno Seppinen, Antti Eronen, Jarmo Hiipakka: Method, apparatus and computer program product for providing rhythm information from an audio signal. Nokia November 2009: U.S. Pat. No. 7,612,275.

[4] Antti Eronen and Timo Kosonen, "Creating and sharing variations of a music file"—United States Patent Application 20070261537.

[5] Klapuri, A., Eronen, A., Astola, J., "Analysis of the meter of acoustic musical signals," IEEE Trans. Audio, Speech, and Language Processing, Vol. 14, No. 1, 2006.

[6] Jehan, Creating Music by Listening, PhD Thesis, MIT, 2005. http://web.media.mit.edu/~tristan/phd/pdf/Tristan PhD MIT.pdf

[7] D. Ellis, "Beat Tracking by Dynamic Programming", J. New Music Research, Special Issue on Beat and Tempo Extraction, vol. 36 no. 1, March 2007, pp. 51-60. (10pp) DOI: 10.1080/09298210701653344

SUMMARY OF THE INVENTION

A first aspect of the invention provides apparatus comprising: a beat tracking module for identifying beat time instants ($t_i$) in an audio signal; a chord change estimation module for determining at least one chord change likelihood from the audio signal at or between the beat time instants ($t_i$); a first accent-based estimation module for determining at least one first accent-based downbeat likelihood from the audio signal at or between the beat time instants ($t_i$); and a downbeat identifier for identifying downbeats occurring at beat time instants ($t_i$) using the determined chord change likelihood and the first accent-based downbeat likelihood at or between the beat time instants ($t_i$).

Embodiments of the invention can provide a robust and computationally straightforward system and method for determining downbeats in a music signal.

The downbeat identifier may be configured to use a predefined score-based algorithm that takes as input numerical representations of the determined chord change likelihood and the first accent-based downbeat likelihood at or between the beat time instants ($t_i$).

The downbeat identifier may be configured to use a decision-based logic circuit that takes as input numerical representations of the determined chord change likelihood and the first accent-based downbeat likelihood at or between the beat time instants ($t_i$).

The beat tracking module may be configured to extract accent features from the audio signal to generate an accent signal, to estimate from the accent signal the tempo of the audio signal and to estimate from the tempo and the accent signal the beat time instants ($t_i$).

The beat tracking module may be configured to generate the accent signal by means of extracting chroma accent features based on fundamental frequency ($f_0$) salience analysis.

The beat tracking module may be configured to generate the accent signal by means of a multi-rate filter bank-type decomposition of the audio signal.

The beat tracking module may be configured to generate the accent signal by means of extracting chroma accent features based on fundamental frequency salience analysis in combination with a multi-rate filter bank-type decomposition of the audio signal.

The chord change estimation module may use a predefined algorithm that takes as input a value of pitch chroma at or between the current beat time instant ($t_i$) and one or more values of pitch chroma at or between preceding and/or succeeding beat time instants.

The predefined algorithm may take as input values of pitch chroma at or between the current beat time instant ($t_i$) and at or between a predefined number of preceding and succeeding beat time instants to generate a chord change likelihood using a sum of differences or similarities calculation.

The predefined algorithm may take as input values of average pitch chroma at or between the current and preceding and/or succeeding beat time instants.

The predefined algorithm may be defined as:

$$\text{Chord\_change}(t_i) = \sum_{j=1}^{x}\sum_{k=1}^{y}|\bar{c}_j(t_i) - \bar{c}_j(t_{i-k})| - \sum_{j=1}^{x}\sum_{k=1}^{z}|\bar{c}_j(t_i) - \bar{c}_j(t_{i+k})|$$

where x is number of chroma or pitch classes, y is number of preceding beat time instants and z is number of succeeding beat time instants.

The chord change estimation module may be configured to calculate the pitch chroma or average pitch chroma by means of extracting chroma features based on fundamental frequency ($f_0$) salience analysis.

The apparatus may further comprise a second accent-based estimation module for determining a second, different, accent-based downbeat likelihood from the audio signal at or between the beat time instants ($t_i$) and wherein the downbeat identifier is further configured to take as input to the score-based algorithm the second accent-based downbeat likelihood.

One of the accent-based estimation modules may be configured to apply to a predetermined likelihood algorithm or transform chroma accent features extracted from the audio signal for or between the beat time instants ($t_i$), the chroma accent features being extracted using fundamental frequency ($f_0$) salience analysis.

The other of the accent-based estimation modules may be configured to apply to a predetermined likelihood algorithm or transform accent features extracted from each of a plurality of sub-bands of the audio signal.

The or each accent estimation module may be configured to apply the accent features to a linear discriminate analysis (LDA) transform at or between the beat time instants ($t_i$) to obtain a respective accent-based numerical likelihood.

The apparatus may further comprise means for normalising the values of chord change likelihood and the or each accent-based downbeat likelihood prior to input to the downbeat identifier.

The normalising means may be configured to divide each of the values with their maximum absolute value.

The downbeat identifier may be configured to generate, for each of a set of beat time instances, a score representing or including the summation of the chord change likelihood value and the or each accent-based downbeat likelihood, and to identify a downbeat from the highest resulting likelihood value over the set of beat time instances.

The downbeat identifier may apply the algorithm:

$$\text{score}(t_n) = \frac{1}{\text{card}(S(t_n))}\sum_{j\in S(t_n)}(w_c\text{Chord\_change}(j) + w_a a(j) + w_m m(j)),$$
$$n = 1, \ldots, M$$

$S(t_n)$ is the set of beat times $t_n$, $t_{n+M}$, $t_{n+2M}$, . . . , M is the number of beats in a measure, and $w_c$, $w_a$, and $w_m$ are the weights for the chord change possibility, a first accent-based downbeat likelihood and a second accent-based downbeat likelihood, respectively.

The apparatus may further comprise: means for receiving a plurality of video clips, each having a respective audio signal having common content; and a video editing module for identifying possible editing points for the video clips using the identified downbeats.

The video editing module may further be configured to join a plurality of video clips at one or more editing points to generate a joined video clip.

A second aspect of the invention provides apparatus for processing an audio signal comprising: a beat tracking module for identifying beat time instants ($t_i$) in the audio signal; a chord change estimation module for determining at least one chord change likelihood from chroma accent information in the audio signal at or between the beat time instants ($t_i$); first and second accent-based estimation modules for determining respective first and second accent-based downbeat likelihood values from the audio signal at or between the beat time instants ($t_i$) using respective different algorithms; and a downbeat identifier for identifying downbeats occurring at beat time instants ($t_i$) using numerical representations of chord change likelihood and the first and second accent-based downbeat likelihood values at or between the beat time instants ($t_i$).

A third aspect of the invention provides a method comprising: identifying beat time instants ($t_i$) in an audio signal; determining at least one chord change likelihood from the audio signal at or between the beat time instants ($t_i$); determining at least one first accent-based downbeat likelihood from the audio signal at or between the beat time instants ($t_i$); and identifying downbeats occurring at beat time instants ($t_i$) using the chord change likelihood and the first accent-based downbeat likelihood at or between the beat time instants ($t_i$).

Identifying downbeats may use a predefined score-based algorithm that takes as input numerical representations of the determined chord change likelihood and the first accent-based downbeat likelihood at or between the beat time instants ($t_i$).

Identifying downbeats may use decision-based logic that takes as input numerical representations of the determined chord change likelihood and the first accent-based downbeat likelihood at or between the beat time instants ($t_i$).

Identifying beat time instants ($t_i$) may comprise extracting accent features from the audio signal to generate an accent signal, to estimate from the accent signal the tempo of the audio signal and to estimate from the tempo and the accent signal the beat time instants ($t_i$).

The method may further comprise generating the accent signal by means of extracting chroma accent features based on fundamental frequency ($f_0$) salience analysis.

The method may further comprise generating the accent signal by means of a multi-rate filter bank-type decomposition of the audio signal.

The method may further comprise generating the accent signal by means of extracting chroma accent features based on fundamental frequency salience analysis in combination with a multi-rate filter bank-type decomposition of the audio signal.

Determining a chord change likelihood may use a predefined algorithm that takes as input a value of pitch chroma at or between the current beat time instant ($t_i$) and one or more values of pitch chroma at or between preceding and/or succeeding beat time instants.

The predefined algorithm may take as input values of pitch chroma at or between the current beat time instant ($t_i$) and at or between a predefined number of preceding and succeeding beat time instants to generate a chord change likelihood using a sum of differences or similarities calculation.

The predefined algorithm may take as input values of average pitch chroma at or between the current and preceding and/or succeeding beat time instants.

The predefined algorithm may be defined as:

$$\text{Chord\_change}(t_i) = \sum_{j=1}^{x}\sum_{k=1}^{y}|\bar{c}_j(t_i) - \bar{c}_j(t_{i-k})| - \sum_{j=1}^{x}\sum_{k=1}^{z}|\bar{c}_j(t_i) - \bar{c}_j(t_{i+k})|$$

where x is number of chroma or pitch classes, y is number of preceding beat time instants and z is number of succeeding beat time instants.

Determining a chord change likelihood may calculate the pitch chroma or average pitch chroma by means of extracting chroma features based on fundamental frequency ($f_0$) salience analysis.

The method may further comprise determining a second, different, accent-based downbeat likelihood from the audio signal at or between the beat time instants ($t_i$) and wherein identifying downbeats further comprises taking as an input to the score-based algorithm the second accent-based downbeat likelihood.

Determining one of the accent-based downbeat likelihoods may comprise applying to a predetermined likelihood algorithm or transform chroma accent features extracted from the audio signal for or between the beat time instants ($t_i$), the chroma accent features being extracted using fundamental frequency ($f_0$) salience analysis.

Determining the other of the accent-based downbeat likelihoods may comprise applying to a predetermined likelihood algorithm or transform accent features extracted from each of a plurality of sub-bands of the audio signal.

Determining the accent-based downbeat likelihoods may comprise applying the accent features to a linear discriminate analysis (LDA) transform at or between the beat time instants ($t_i$) to obtain a respective accent-based numerical likelihood.

The method may further comprise normalising the values of chord change likelihood and the or each accent-based downbeat likelihood prior to identifying downbeats.

The normalising step may comprise dividing each of the values with their maximum absolute value.

Identifying downbeats may comprise generating, for each of a set of beat time instances, a score representing or including the summation of the chord change likelihood value and the or each accent-based downbeat likelihood, and to identify a downbeat from the highest resulting likelihood value over the set of beat time instances.

Identifying downbeats may use the algorithm:

$$\text{score}(t_n) = \frac{1}{\text{card}(S(t_n))}\sum_{j\in S(t_n)}(w_c\text{Chord\_change}(j) + w_a a(j) + w_m m(j)),$$
$$n = 1, \ldots, M$$

where $S(t_n)$ is the set of beat times $t_n$, $t_{n+M}$, $t_{n+2M}$, . . . , M is the number of beats in a measure and $w_c$, $w_a$, and $w_m$ are the weights for the chord change possibility, a first accent-based downbeat likelihood and a second accent-based downbeat likelihood, respectively.

A third aspect of the invention provides a method of processing video clips, the method comprising: receiving a plurality of video clips, each having a respective audio signal having common content; performing the method of the second aspect, or any preferred feature thereof, to identify downbeats; and identifying editing points for the video clips using the identified downbeats.

The method of the third aspect may further comprise joining a plurality of video clips at the editing points to generate a joined video clip.

A fourth aspect of the invention provides a method comprising: identifying beat time instants ($t_i$) in an audio signal; determining at least one chord change likelihood from chroma accent information in the audio signal at or between the beat time instants ($t_i$); determining respective first and second accent-based downbeat likelihood values from the audio signal at the beat time instants ($t_i$) using respective different algorithms; and identifying downbeats occurring at beat time instants ($t_i$) using numerical representations of chord change likelihood and the first and second accent-based downbeat likelihood values at or between the beat time instants ($t_i$).

A fifth aspect of the invention provides a computer program comprising instructions that when executed by a computer apparatus control it to perform the method described previously.

A sixth aspect of the invention provides a non-transitory computer-readable storage medium having stored thereon computer-readable code, which, when executed by computing apparatus, causes the computing apparatus to perform a method comprising: identifying beat time instants (ti) in an audio signal; determining at least one chord change likelihood from the audio signal at or between the beat time instants (ti); determining at least one first accent-based downbeat likelihood from the audio signal at or between the beat time instants (ti); and identifying downbeats occurring at beat time instants (ti) using numerical representations of chord change likelihood and the first accent-based downbeat likelihood at or between the beat time instants (ti).

A seventh aspect of the invention provides apparatus, the apparatus having at least one processor and at least one memory having computer-readable code stored thereon which when executed controls the at least one processor: to identify beat time instants (ti) in the audio signal; to determine at least one chord change likelihood from the audio signal at or between the beat time instants (ti); to determine at least one first accent-based downbeat likelihood from the audio signal at or between the beat time instants (ti); and to identify downbeats occurring at beat time instants (ti) using numerical representations of chord change likelihood and the first accent-based downbeat likelihood at or between the beat time instants (ti).

BRIEF DESCRIPTION OF THE DRAWINGS

Embodiments of the invention will now be described by way of non-limiting example with reference to the accompanying drawings, in which.

DETAILED DESCRIPTION OF EMBODIMENTS

Embodiments described below relate to systems and methods for audio analysis, primarily the analysis of music and its musical meter in order to identify downbeats. As noted above, downbeats are defined as the first beat in a bar or measure of music; they are considered to represent musically meaningful points that can be used for various practical applications, including music recommendation algorithms, DJ applications and automatic looping. The specific embodiments described below relate to a video editing system which automatically cuts video clips using downbeats identified in their associated audio track as video angle switching points.

Figure 1:
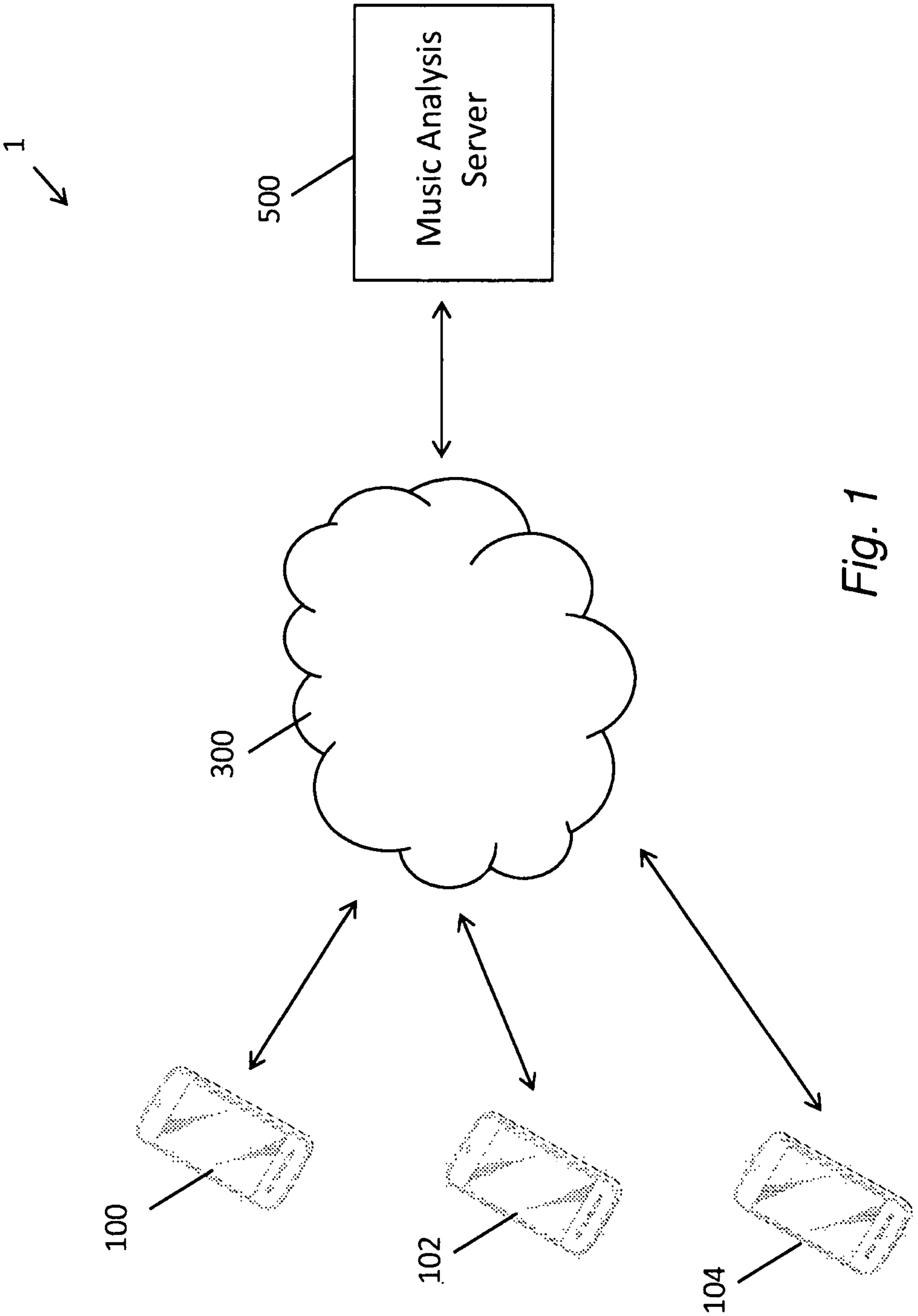
FIG. 1 is a schematic diagram of a network including a music analysis server according to the invention and a plurality of terminals.

Referring to FIG. 1, a music analysis server 500 (hereafter "analysis server") is shown connected to a network 300, which can be any data network such as a Local Area Network (LAN), Wide Area Network (WAN) or the Internet. The analysis server 500 is configured to analyse audio associated with received video clips in order to identify downbeats for the purpose of automated video editing. This will be described in detail later on.

External terminals 100, 102, 104 in use communicate with the analysis server 500 via the network 300, in order to upload video clips having an associated audio track. In the present case, the terminals 100, 102, 104 incorporate video camera and audio capture (i.e. microphone) hardware and software for the capturing, storing and uploading and downloading of video data over the network 300.

Figure 2:
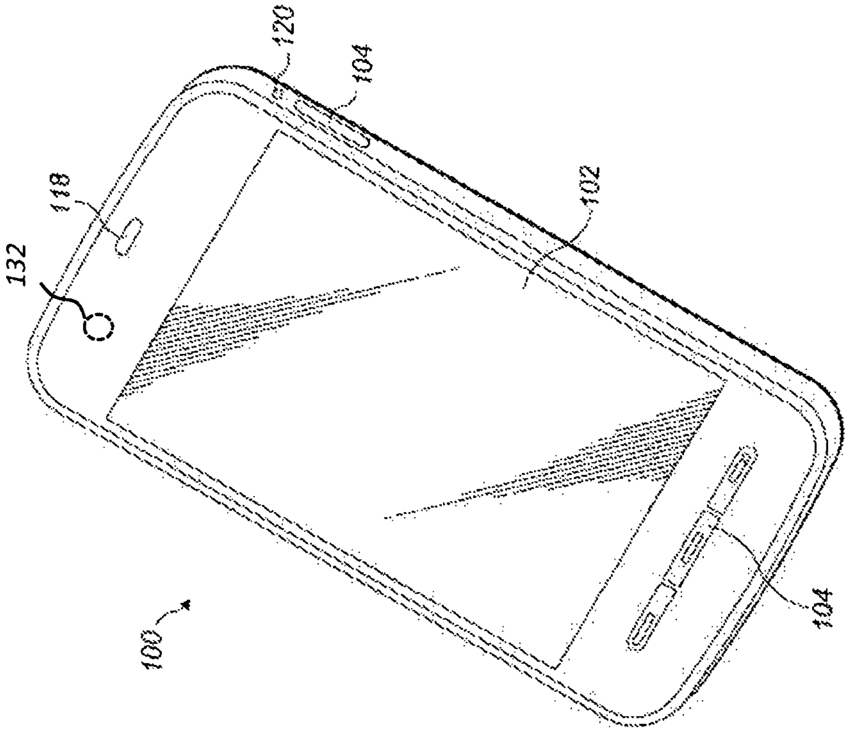
FIG. 2 is a perspective view of one of the terminals shown in FIG. 1.

Referring to FIG. 2, one of said terminals 100 is shown, although the other terminals 102, 104 are considered identical or similar. The exterior of the terminal 100 has a touch sensitive display 102, hardware keys 104, a rear-facing camera 105, a speaker 118 and a headphone port 120.

Figure 3:
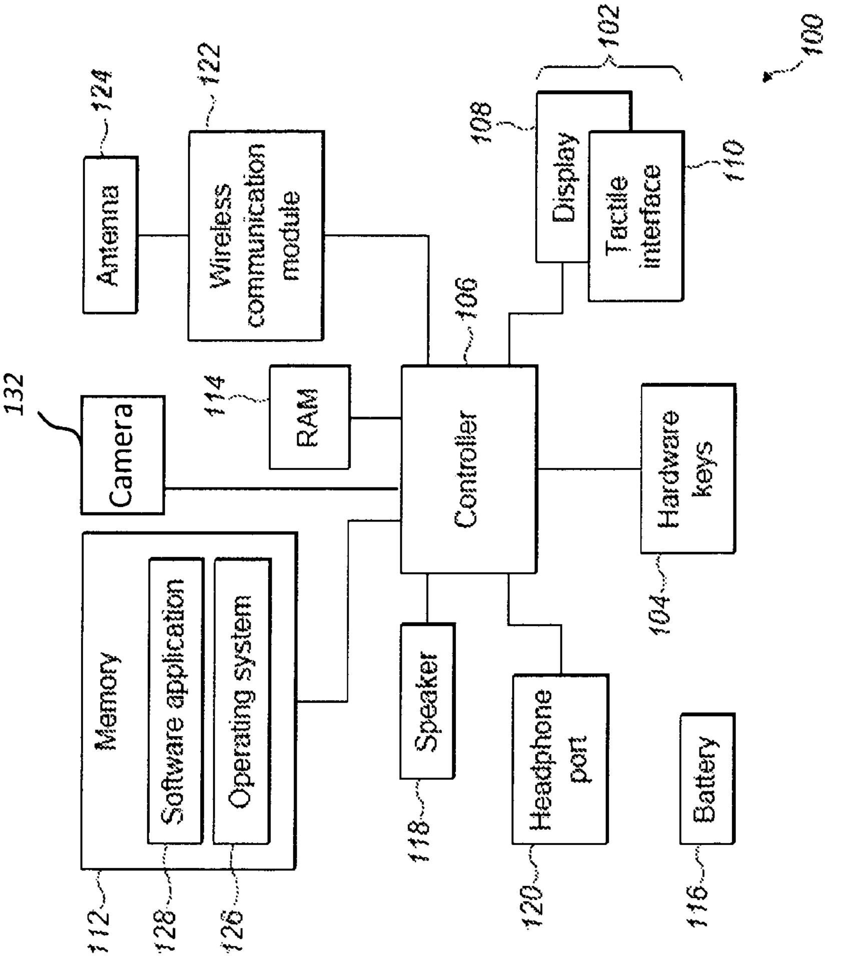
FIG. 3 is a schematic diagram of components of the terminal shown in FIG. 2.

FIG. 3 shows a schematic diagram of the components of terminal 100. The terminal 100 has a controller 106, a touch sensitive display 102 comprised of a display part 108 and a tactile interface part 110, the hardware keys 104, the camera 132, a memory 112, RAM 114, a speaker 118, the headphone port 120, a wireless communication module 122, an antenna 124 and a battery 116. The controller 106 is connected to each of the other components (except the battery 116) in order to control operation thereof.

The memory 112 may be a non-volatile memory such as read only memory (ROM) a hard disk drive (HDD) or a solid state drive (SSD). The memory 112 stores, amongst other things, an operating system 126 and may store software applications 128. The RAM 114 is used by the controller 106 for the temporary storage of data. The operating system 126 may contain code which, when executed by the controller 106 in conjunction with RAM 114, controls operation of each of the hardware components of the terminal.

The controller 106 may take any suitable form. For instance, it may be a microcontroller, plural microcontrollers, a processor, or plural processors.

The terminal 100 may be a mobile telephone or smartphone, a personal digital assistant (PDA), a portable media player (PMP), a portable computer or any other device capable of running software applications and providing audio outputs. In some embodiments, the terminal 100 may engage in cellular communications using the wireless communications module 122 and the antenna 124. The wireless communications module 122 may be configured to communicate via several protocols such as Global System for Mobile Communications (GSM), Code Division Multiple Access (CDMA), Universal Mobile Telecommunications System (UMTS), Bluetooth and IEEE 802.11 (Wi-Fi).

The display part 108 of the touch sensitive display 102 is for displaying images and text to users of the terminal and the tactile interface part 110 is for receiving touch inputs from users.

As well as storing the operating system 126 and software applications 128, the memory 112 may also store multimedia files such as music and video files. A wide variety of software applications 128 may be installed on the terminal including Web browsers, radio and music players, games and utility applications. Some or all of the software applications stored on the terminal may provide audio outputs.

The audio provided by the applications may be converted into sound by the speaker(s) 118 of the terminal or, if headphones or speakers have been connected to the headphone port 120, by the headphones or speakers connected to the headphone port 120.

In some embodiments the terminal 100 may also be associated with external software application not stored on the terminal. These may be applications stored on a remote server device and may run partly or exclusively on the remote server device. These applications can be termed cloud-hosted applications. The terminal 100 may be in communication with the remote server device in order to utilise the software application stored there. This may include receiving audio outputs provided by the external software application.

In some embodiments, the hardware keys 104 are dedicated volume control keys or switches. The hardware keys may for example comprise two adjacent keys, a single rocker switch or a rotary dial. In some embodiments, the hardware keys 104 are located on the side of the terminal 100.

One of said software applications 128 stored on memory 112 is a dedicated application (or "App") configured to upload captured video clips, including their associated audio track, to the analysis server 500.

The analysis server 500 is configured to receive video clips from the terminals 100, 102, 104 and to identify downbeats in each associated audio track for the purposes of automatic video processing and editing, for example to join clips together at musically meaningful points. Instead of identifying downbeats in each associated audio track, the analysis server 500 may be configured to analyse the downbeats in a common audio track which has been obtained by combining parts from the audio track of one or more video clips.

Figure 4:
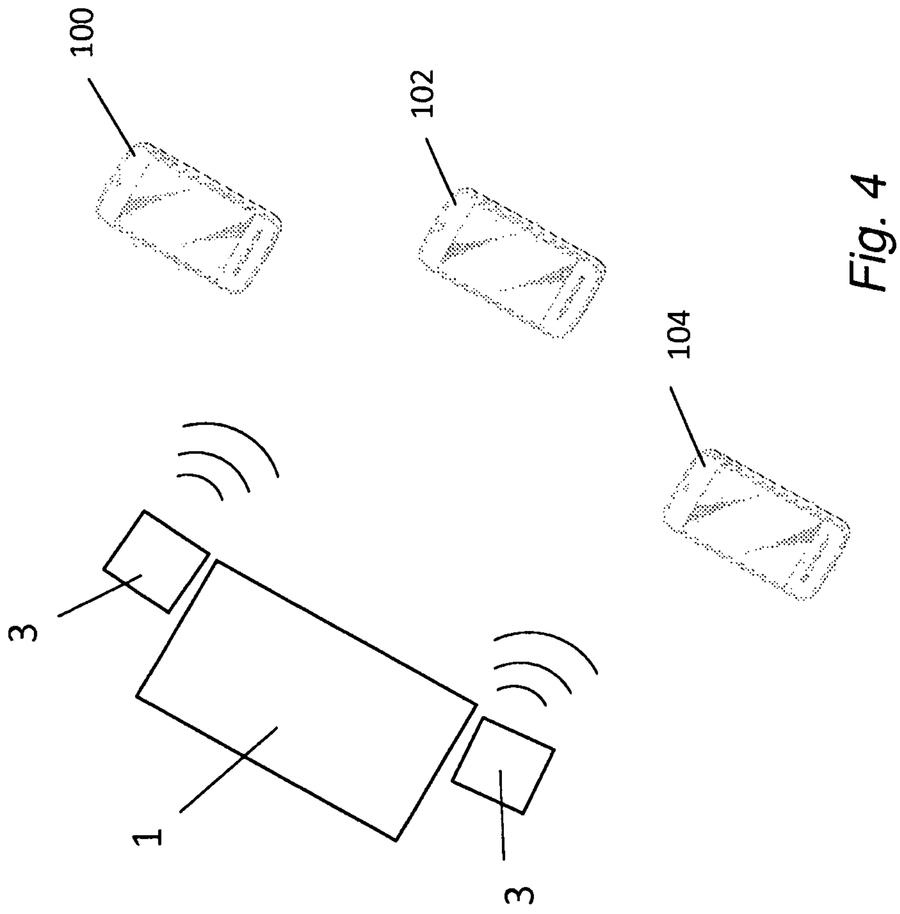
FIG. 4 is a schematic diagram showing the terminals of FIG. 1 when used at a common musical event.

Referring to FIG. 4, a practical example will now be described. Each of the terminals 100, 102, 104 is shown in use at an event which is a music concert represented by a stage area 1 and speakers 3. Each terminal 100, 102, 104 is assumed to be capturing the event using their respective video cameras; given the different positions of the terminals 100, 102, 104 the respective video clips will be different but there will be a common audio track providing they are all capturing over a common time period.

Users of the terminals 100, 102, 104 subsequently upload their video clips to the analysis server 500, either using their above-mentioned App or from a computer with which the terminal synchronises. At the same time, users are prompted to identify the event, either by entering a description of the event, or by selecting an already-registered event from a pull-down menu. Alternative identification methods may be envisaged, for example by using associated GPS data from the terminals 100, 102, 104 to identify the capture location.

At the analysis server 500, received video clips from the terminals 100, 102, 104 are identified as being associated with a common event. Subsequent analysis of each video clip can then be performed to identify downbeats which are used as useful video angle switching points for automated video editing.

Figure 5:
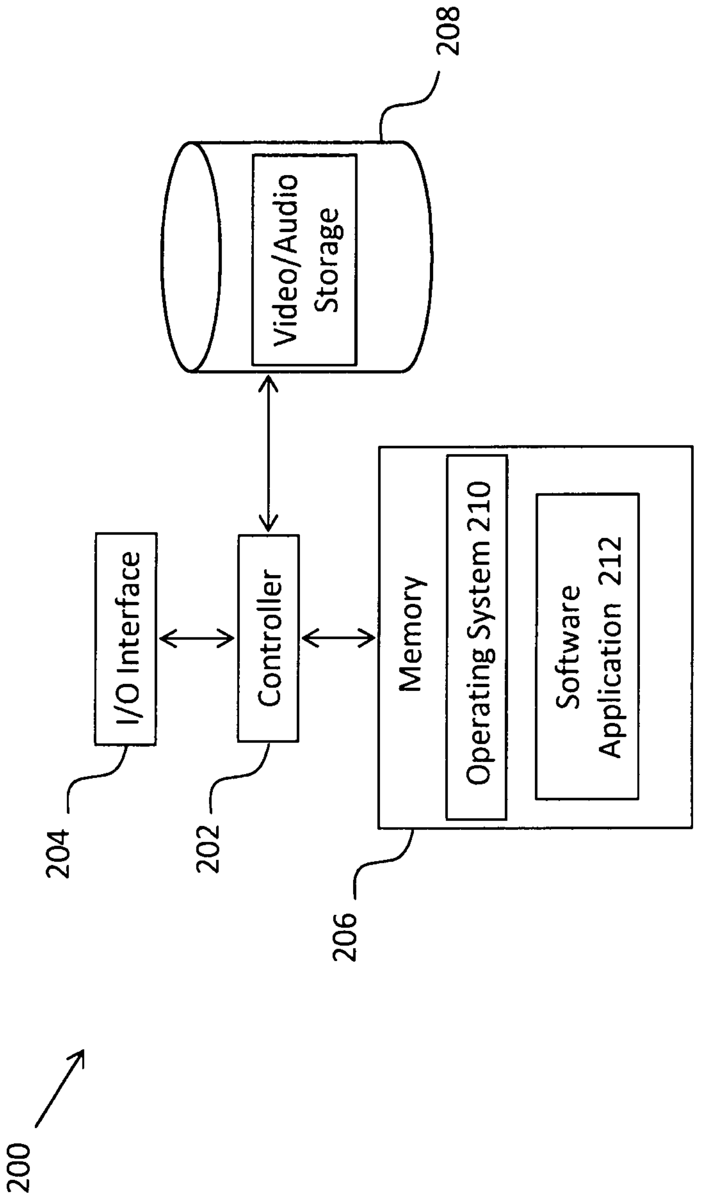
FIG. 5 is a schematic diagram of components of the analysis server shown in FIG. 1.

Referring to FIG. 5, hardware components of the analysis server 500 are shown. These include a controller 202, an input and output interface 204, a memory 206 and a mass storage device 208 for storing received video and audio clips. The controller 202 is connected to each of the other components in order to control operation thereof.

The memory 206 (and mass storage device 208) may be a non-volatile memory such as read only memory (ROM) a hard disk drive (HDD) or a solid state drive (SSD). The memory 206 stores, amongst other things, an operating system 210 and may store software applications 212. RAM (not shown) is used by the controller 202 for the temporary storage of data. The operating system 210 may contain code which, when executed by the controller 202 in conjunction with RAM, controls operation of each of the hardware components.

The controller 202 may take any suitable form. For instance, it may be a microcontroller, plural microcontrollers, a processor, or plural processors.

The software application 212 is configured to control and perform the video processing, including processing the associated audio signal to identify downbeats.

Figure 6:
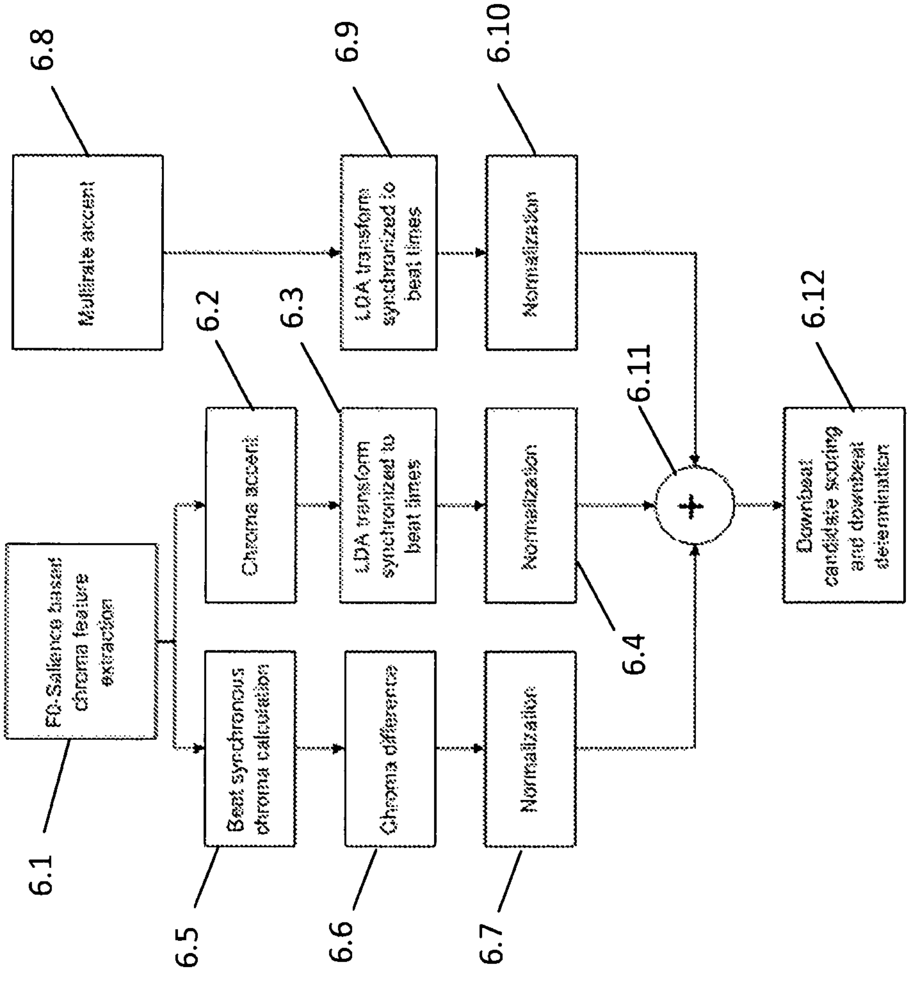
FIG. 6 is a block diagram showing processing stages performed by the analysis server shown in FIG. 1.

The downbeat identification process will now be described with reference to FIG. 6.

It will be seen that three processing paths are defined (left, middle, right); the reference numerals applied to each processing stage are not indicative of order of processing. In some implementations, the three processing paths might be performed in parallel allowing fast execution. In overview, beat tracking is performed to identify or estimate beat times in the audio signal. Then, at the beat times, each processing path generates a numerical value representing a differently-derived likelihood that the current beat is a downbeat. These likelihood values are normalised and then summed in a score-based decision algorithm that identifies which beat in a window of adjacent beats is a downbeat.

Fundamental Frequency-Based Chroma Feature Extraction

The method starts in step 6.1 by generating two signals calculated based on fundamental frequency ($f_0$) salience estimation.

One signal represents the chroma accent signal which in step 6.2 is extracted from the salience information using the method described in [2]. The chroma accent signal is considered to represent musical change as a function of time. Since this accent signal is extracted based on the $f_0$ information, it emphasises harmonic and pitch information in the signal.

The chroma accent signal serves two purposes. Firstly, it is used for estimating tempo and beat tracking. It is also used for generating a likelihood value, to be described later down.

Beat Tracking

The chroma accent signal is employed to calculate an estimate of the tempo (BPM) and for beat tracking. For BPM determination, the method described in [2] is also employed. Alternatively, other methods for BPM determination can be used.

To obtain the beat time instants, a dynamic programming routine as described in [7] is employed. Alternatively, the beat tracking method described in [3] can be employed. Alternatively, any suitable beat tracking routine can be utilized, which is able to find the sequence of beat times over the music signal given one or more accent signals as input and at least one estimate of the BPM of the music signal. Instead of operating on the chroma accent signal, the beat tracking might operate on the multirate accent signal or any combination of the chroma accent signal and the multirate accent signal. Alternatively, any suitable accent signal analysis method, periodicity analysis method, and a beat tracking method might be used for obtaining the beats in the music signal. In some embodiments, part of the information required by the beat tracking step might originate from outside the audio signal analysis system. An example would be a method where the BPM estimate of the signal would be provided externally.

The resulting beat times $t_i$ are used as input for the downbeat determination stage to be described later on and for synchronised processing of data in all three branches of the FIG. 6 process. Ultimately, the task is to determine which of these beat times correspond to downbeats, that is the first beat in the bar or measure.

Chroma Difference Calculation & Chord Change Possibility

The left-hand path (steps 6.5 and 6.6) calculates what the average pitch chroma is at the aforementioned beat locations and infers a chord change possibility which, if high, is considered indicative of a downbeat. Each step will now be described.

Beat Synchronous Chroma Calculation

In step 6.5, the method described in [2] is employed to obtain the chroma vectors and the average chroma vector is calculated for each beat location. Alternatively, any suitable method for obtaining the chroma vectors might be employed. For example, a computationally simple method would use the Fast Fourier Transform (FFT) to calculate the short-time spectrum of the signal in one or more frames corresponding to the music signal between two beats. The chroma vector could then be obtained by summing the magnitude bins of the FFT belonging to the same pitch class. Such a simple method may not provide the most reliable chroma and/or chord change estimates but may be a viable solution if the computational cost of the system needs to be kept very low.

Instead of calculating the chroma at each beat location, a sub-beat resolution could be used. For example, two chroma vectors per each beat could be calculated.

Chroma Difference Calculation

Next, in step 6.6, a "chord change possibility" is estimated by differentiating the previously determined average chroma vectors for each beat location.

Trying to detect chord changes is motivated by the musicological knowledge that chord changes often occur at downbeats. The following function is used to estimate the chord change possibility:

$$\text{Chord\_change}(t_i) = \sum_{j=1}^{12}\sum_{k=1}^{3}|\bar{c}_j(t_i) - \bar{c}_j(t_{i-k})| - \sum_{j=1}^{12}\sum_{k=1}^{3}|\bar{c}_j(t_i) - \bar{c}_j(t_{i+k})|$$

The first sum term in Chord_change($t_i$) represents the sum of absolute differences between the current beat chroma vector and the three previous chroma vectors. The second sum term represents the sum of the next three chroma vectors. When a chord change occurs at beat $t_i$, the difference between the current beat chroma vector $\bar{c}(t_i)$ and the three previous chroma vectors will be larger than the difference between $\bar{c}(t_i)$ and the next three chroma vectors. Thus, the value of Chord_change($t_i$) will peak if a chord change occurs at time $t_i$.

Similar principles have been used in [1] and [6], but the actual computations differ.

Alternatives and variations for the Chord_change function include, for example: using more than 12 pitch classes in the summation of j. In some embodiments, the value of pitch classes might be, e.g., 36, corresponding to a ⅓$^{rd}$ semitone resolution with 36 bins per octave. In addition, the function can be implemented for various time signatures. For example, in the case of a 3/4 time signature the values of k could range from 1 to 2. In some other embodiments, the amount of preceding and following beat time instants used in the chord change possibility estimation might differ. Various other distance or distortion measures could be used, such as Euclidean distance, cosine distance, Manhattan distance, Mahalanobis distance. Also statistical measures could be applied, such as divergences, including, for example, the Kullback-Leibler divergence. Alternatively, similarities could be used instead of differences. The benefit of the Chord_change function above is that it is computationally very simple.

Chroma Accent and Multirate Accent Calculation

Regarding the central path (steps 6.2, 6.3) the process of generating the salience-based chroma accent signal has already been described above in relation to beat tracking. The chroma accent signal is applied at the determined beat instances to a linear discriminant transform (LDA) in step 6.3, mentioned below.

Regarding the right hand path (steps 6.8, 6.9) another accent signal is calculated using the accent signal analysis method described in [3]. This accent signal is calculated using a computationally efficient multi rate filter bank decomposition of the signal.

When compared with the previously described $F_o$ salience-based accent signal, this multi rate accent signal relates more to drum or percussion content in the signal and does not emphasise harmonic information. Since both drum patterns and harmonic changes are known to be important for downbeat determination, it is attractive to use/combine both types of accent signals.

LDA Transform of Accent Signals

The next step performs separate LDA transforms at beat time instants on the accent signals generated at steps 6.2 and 6.8 to obtain from each processing path a downbeat likelihood for each beat instance.

The LDA transform method can be considered as an alternative for the measure templates presented in [5]. The idea of the measure templates in [5] was to model typical accentuation patterns in music during one measure. For example, a typical pattern could be low, loud, -, loud, meaning an accent with lots of low frequency energy at the first beat, an accent with lots of energy across the frequency spectrum on the second beat, no accent on the third beat, and again an accent with lots of energy across the frequency spectrum on the fourth beat. This corresponds, for example, to the drum pattern bass, snare, -, snare.

The benefit of using LDA templates compared to manually designed rhythmic templates is that they can be trained from a set of manually annotated training data, whereas the rhythmic templates were manually obtained. This increases the downbeat determination accuracy based on our simulations.

Using LDA for beat determination was suggested in [1]. Thus, the main difference between [1] and the present embodiment is that here we use LDA trained templates for discriminating between "downbeat" and "beat", whereas in [1] the discrimination was done between "beat" and "non-beat".

Referring to [1] it will be appreciated that LDA analysis involves a training phase and an evaluation phase.

In the training phase, LDA analysis is performed twice, separately for the salience-based chroma accent signal (from step 6.2) and the multirate accent signal (from step 6.8).

The chroma accent signal from step 6.2 is a one dimensional vector.

The training method for both LDA transform stages (steps 6.3, 6.9) is as follows:

1) sample the accent signal at beat positions;

2) go through the sampled accent signal at one beat steps, taking a window of four beats in turn;

3) if the first beat in the window of four beats is a downbeat, add the sampled values of the accent signal corresponding to the four beats to a set of positive examples;

4) if the first beat in the window of four beats is not a downbeat, add the sampled values of the accent signal corresponding to the four beats to a set of negative examples;

5) store all positive and negative examples. In the case of the chroma accent signal from step 6.2, each example is a vector of length four;

6) after all the data has been collected (from a catalogue of songs with annotated beat and downbeat times), perform LDA analysis to obtain the transform matrices.

When training the LDA transform, it is advantageous to take as many positive examples (of downbeats) as there are negative examples (not downbeats). This can be done by randomly picking a subset of negative examples and making the subset size match the size of the set of positive examples.

7) collect the positive and negative examples in an M by d matrix [X]. M is the number of samples and d is the data dimension. In the case of the chroma accent signal from step 6.2, d=4.

9) Normalize the matrix [X] by subtracting the mean across the rows and dividing by the standard deviation.

10) Perform LDA analysis as is known in the art to obtain the linear coefficients W. Store also the mean and standard deviation of the training data.

In the online downbeat detection phase (i.e. the evaluation phases steps 6.3 and 6.9) the downbeat likelihood is obtained using the method:

for each recognized beat time, construct a feature vector x of the accent signal value at the beat instant and three next beat time instants;

subtract the mean and divide with the standard deviation of the training data the input feature vector x;

calculate a score x*W for the beat time instant, where x is a 1 by d input feature vector and W is the linear coefficient vector of size d by 1.

A high score may indicate a high downbeat likelihood and a low score may indicate a low downbeat likelihood.

In the case of the chroma accent signal from step 6.2, the dimension d of the feature vector is 4, corresponding to one accent signal sample per beat. In the case of the multirate accent signal from step 6.8, the accent has four frequency bands and the dimension of the feature vector is 16.

The feature vector is constructed by unraveling the matrix of bandwise feature values into a vector.

In the case of time signatures other than 4/4, the above processing is modified accordingly. For example, when training a LDA transform matrix for a 3/4 time signature, the accent signal is travelled in windows of three beats. Several such transform matrices may be trained, for example, one corresponding to each time signature the system needs to be able to operate under.

Various alternatives to the LDA transform are possible. These include, for example, training any classifier, predictor, or regression model which is able to model the dependency between accent signal values and downbeat likelihood. Examples include, for example, support vector machines with various kernels, Gaussian or other probabilistic distributions, mixtures of probability distributions, k-nearest neighbour regression, neural networks, fuzzy logic systems, decision trees, and so on. The benefit of the LDA is that it is straightforward to implement and computationally simple.

Downbeat Candidate Scoring and Downbeat Determination

When the audio has been processed using the above-described steps, an estimate for the downbeat is generated by applying the chord change likelihood and the first and second accent-based likelihood values in a non-causal manner to a score-based algorithm. Before computing the final score, the chord change possibility and the two downbeat likelihood signals are normalized by dividing with their maximum absolute value (see steps 6.4, 6.7 and 6.10).

The possible first downbeats are $t_1$, $t_2$, $t_3$, $t_4$, and the one that is selected is the one maximizing:

$$\text{score}(t_n) = \frac{1}{\text{card}(S(t_n))} \sum_{j \in S(t_n)} (w_c \text{Chord\_change}(j) + w_a a(j) + w_m m(j)),$$
$$n = 1, \ldots, 4$$

$S(t_n)$ is the set of beat times $t_n$, $t_{n+4}$, $t_{n+g}$, . . . .

$w_c$, $w_a$, and $w_m$ are the weights for the chord change possibility, chroma accent based downbeat likelihood, and multirate accent based downbeat likelihood, respectively. Step 6.11 represents the above summation and step 6.12 the determination based on the highest score for the window of possible downbeats.

Note that the above scoring function was presented in the case of a 4/4 time signature. In the case of a 3/4 time signature, for example, the summation could be done across every three beats. Various modifications are possible and apparent, such as using a product of the chord change possibilities based on the different accent signals instead of the sum, or using a median instead of the average. Moreover, more complex decision logic could be implemented, for example, one possibility could be to train a classifier which would input the score($t_n$) and output the decision for the downbeat. As another example, a classifier could be trained which would input chord change possibility, chroma accent based downbeat likelihood, and/or multirate accent based downbeat likelihood, and which would output the decision for the downbeat. For example, a neural network could be used to learn the mapping between the downbeat likelihood curves and the downbeat positions, including the weights $w_c$, $w_a$, and $w_m$. In general, the determination of the downbeat could be done by any decision logic which is able to take the chord change possibility and downbeat likelihood curves as input and produce the downbeat location as output. In addition, in the case where we can assume that the music contains only full measures at a certain time signature, the above score may be calculated over all the beats in the signal. As another example, the above score could be calculated at sub-beat resolution, for example, at every half beat. In cases where not all measures are full, the above score may be calculated in windows of certain duration over the signal. The benefit of the above scoring method is that it is computationally very simple.

Having identified downbeats within the audio track of the video, a set of meaningful edit points are available to the software application 212 in the analysis server for making musically meaningful cuts to videos.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. An apparatus, the apparatus having at least one processor and at least one memory having computer-readable code stored thereon which when executed causes the at least one processor to:

identify beat time instants ($t_i$) in an audio signal;

determine a chord change likelihood from the audio signal at or between the beat time instants by using a predefined algorithm that takes as input a value of pitch chroma at or between the current beat time instant ($t_i$) and one or more values of pitch chroma at or between preceding and/or succeeding beat time instants, wherein the predefined algorithm is defined as:

$$\text{Chord\_change}(t_i) = \sum_{j=1}^{x}\sum_{k=1}^{y} |\bar{c}_j(t_i) - \bar{c}_j(t_{i-k})| - \sum_{j=1}^{x}\sum_{k=1}^{z} |\bar{c}_j(t_i) - \bar{c}_j(t_{i+k})|$$

where x is a number of chroma or pitch classes, y is a number of preceding beat time instants and z is a number of succeeding beat time instants;

determine a first accent-based downbeat likelihood from the audio signal at or between the beat time instants ($t_i$);

determine a second, different, accent-based downbeat likelihood from the audio signal at or between the beat time instants (ti);

normalize the determined chord change likelihood and the first and second accent based downbeat likelihoods;

identify downbeats by generating, for each of a set of beat time instances, a score representing or including a summation of the chord change likelihood, the first accent-based downbeat likelihood, and the second accent-based downbeat likelihood; and identify a downbeat from a highest resulting likelihood value over the set of beat time instances.

2. The apparatus according to claim 1, wherein the apparatus caused to identify downbeats is further caused to use a predefined score-based algorithm that takes as input numerical representations of the determined chord change likelihood and the first accent-based downbeat likelihood at or between the beat time instants ($t_i$).

3. The apparatus according to claim 1, wherein the apparatus caused identify downbeats is further caused to use a decision-based logic circuit that takes as input numerical representations of the determined chord change likelihood and the first accent-based downbeat likelihood at or between the beat time instants ($t_i$).

4. The apparatus according to claim 1, wherein the apparatus caused to identify beat time instants ($t_i$) is further caused to extract accent features from the audio signal to generate an accent signal, to estimate from the accent signal the tempo of the audio signal and to estimate from the tempo and the accent signal the beat time instants ($t_i$).

5. The apparatus according to claim 4, wherein the apparatus is caused to generate the accent signal by being further caused to extract chroma accent features based on fundamental frequency ($f_0$) salience analysis.

6. The apparatus according to claim 4, wherein the apparatus is caused to generate the accent signal by being further caused to use a multi-rate filter bank-type decomposition of the audio signal.

7. The apparatus according to claim 5, wherein the apparatus caused to generate the accent signal is further caused to extract chroma accent features based on fundamental frequency salience analysis in combination with a multi-rate filter bank-type decomposition of the audio signal.

8. The apparatus according to claim 1, wherein the predefined algorithm takes as input values of pitch chroma at or between the current beat time instant ($t_i$) and at or between a predefined number of preceding and succeeding beat time instants to generate a chord change likelihood using a sum of differences or similarities calculation.

9. The apparatus according to claim 1, wherein the predefined algorithm takes as input values of average pitch chroma at or between the current and preceding and/or succeeding beat time instants.

10. The apparatus according to claim 1, wherein the apparatus caused to determine the change likelihood is further caused to calculate the pitch chroma or average pitch chroma by means of extracting chroma features based on fundamental frequency ($f_0$) salience analysis.

11. The apparatus according to claim 1, wherein the apparatus caused to determine one of the accent-based downbeat likelihoods is further caused to apply to a predetermined likelihood algorithm or transform chroma accent features extracted from the audio signal for or between the beat time instants ($t_i$), the chroma accent features being extracted using fundamental frequency ($f_0$) salience analysis.

12. The apparatus according to claim 11, wherein the apparatus caused to determine one of the accent-based downbeat likelihoods is further caused to apply to a predetermined likelihood algorithm or transform accent features extracted from each of a plurality of sub-bands of the audio signal.

13. The apparatus according to claim 11, wherein the apparatus caused to determine the accent-based downbeat likelihoods is further caused to apply the accent features to a linear discriminate analysis (LDA) transform at or between the beat time instants ($t_i$) to obtain a respective accent-based numerical likelihood.

14. The apparatus according to claim 1, wherein the apparatus caused to normalise is further caused to divide each of the values with their maximum absolute value.

15. The apparatus according to claim 1, wherein the apparatus caused to identify downbeats is further caused to apply an algorithm:

$$\text{score}(t_n) = \frac{1}{\text{card}(S(t_n))} \sum_{j \in S(t_n)} (w_c \text{Chord\_change}(j) + w_a a(j) + w_m m(j)),$$

$$n = 1, \ldots, M$$

$S(t_n)$ is the set of beat times $t_n$, $t_{n+M}$, $t_{n+2M}$, . . . , M is the number of beats in a measure, and $w_c$, $w_a$, and $w_m$ are the weights for the chord change possibility, a first accent-based downbeat likelihood and a second accent-based downbeat likelihood, respectively.

16. A method comprising:

identifying beat time instants ($t_i$) in an audio signal;

determining a chord change likelihood from the audio signal at or between the beat time instants by using a predefined algorithm that takes as input a value of pitch chroma at or between the current beat time instant (ti) and one or more values of pitch chroma at or between preceding and/or succeeding beat time instants, wherein the predefined algorithm is defined as:

$$\text{Chord\_change}(t_i) = \sum_{j=1}^{x}\sum_{k=1}^{y}|\overline{c}_j(t_i) - \overline{c}_j(t_{i-k})| - \sum_{j=1}^{x}\sum_{k=1}^{z}|\overline{c}_j(t_i) - \overline{c}_j(t_{i+k})|$$

where x is a number of chroma or pitch classes, y is a number of preceding beat time instants and z is a number of succeeding beat time instants;

determining a first accent-based downbeat likelihood from the audio signal at or between the beat time instants ($t_i$);

determining a second, different, accent-based downbeat likelihood from the audio signal at or between the beat time instants (ti);

normalizing the determined chord change likelihood and the first and second accent based downbeat likelihoods;

identifying downbeats by generating, for each of a set of beat time instances, a score representing or including a summation of the chord change likelihood, the first accent-based downbeat likelihood, and the second accent-based downbeat likelihood; and identifying a downbeat from a highest resulting likelihood value over the set of beat time instances.

* * * * *